United States Patent [19]
Fedyna

[11] 3,735,504
[45] May 29, 1973

[54] ARITHMETIC TEACHING AID

[76] Inventor: Charles Fedyna, 32 Kileher Avenue, Youngstown, Ohio 44515

[22] Filed: June 29, 1971

[21] Appl. No.: 157,986

[52] U.S. Cl. ............................................... 35/31 C
[51] Int. Cl. ......................................... G09b 19/02
[58] Field of Search .................. 35/31 R, 31 C, 31 D, 35/31 G, 31 F

[56] References Cited

UNITED STATES PATENTS

| 3,352,487 | 11/1967 | Olson et al. | 35/31 R X |
| 3,456,364 | 7/1969 | Alexander | 35/31 G |
| 2,656,618 | 10/1953 | Pescatori | 35/31 C X |
| 3,224,114 | 12/1965 | Swanson | 35/31 D |

OTHER PUBLICATIONS

Calculating Instruments and Machines, Hartree, U. of Illinois Press, 1949, page 61.

Primary Examiner—Wm. H. Grieb
Attorney—John W. Behringer, Eugene L. Bernard, Martin J. Brown et al.

[57] ABSTRACT

An arithmetic teaching aid. A problem board has on its first side a plurality of rows and columns, the intersections of which define locations, and arithmetic designations within those locations and on its second side a like plurality of rows and columns, the intersections of which likewise define locations, and additional arithmetic designations within those locations. Indicating means permit the indication of selected ones of the first side arithmetic designations to present a problem to a student while simultaneously indicating to a tutor the problem and the answer to that problem on the problem board second side.

2 Claims, 9 Drawing Figures

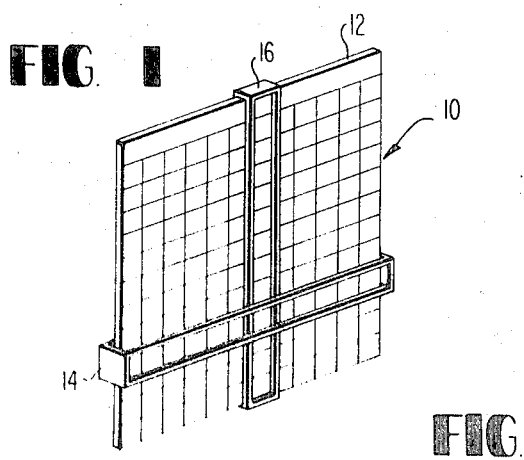

FIG. 4A

| MULTIPLICATION | | | | | | | | | | | |
|---|---|---|---|---|---|---|---|---|---|---|---|
| X | 0 | 1 | 2 | 3 | 4 | 5 | 6 | 7 | 8 | 9 | 10 |
| 0 | | | | | | | | | | | |
| 1 | | | | | | | | | | | |
| 2 | | | | | | | | | | | |
| 3 | | | | | | | | | | | |
| 4 | | | | | | | | | | | |
| 5 | | | | | | | | | | | |
| 6 | | | | | | | | | | | |
| 7 | | | | | | | | | | | |
| 8 | | | | | | | | | | | |
| 9 | | | | | | | | | | | |
| 10 | | | | | | | | | | | |

FIG. 4B

| | | | MULTIPLICATION | | | | | | | |
|---|---|---|---|---|---|---|---|---|---|---|
| 10 | 9 | 8 | 7 | 6 | 5 | 4 | 3 | 2 | 1 | 0 | X |
| 0 | 0 | 0 | 0 | 0 | 0 | 0 | 0 | 0 | 0 | 0 | 0 |
| 10 | 9 | 8 | 7 | 6 | 5 | 4 | 3 | 2 | 1 | 0 | 1 |
| 20 | 18 | 16 | 14 | 12 | 10 | 8 | 6 | 4 | 2 | 0 | 2 |
| 30 | 27 | 24 | 21 | 18 | 15 | 12 | 9 | 6 | 3 | 0 | 3 |
| 40 | 36 | 32 | 28 | 24 | 20 | 16 | 12 | 8 | 4 | 0 | 4 |
| 50 | 45 | 40 | 35 | 30 | 25 | 20 | 15 | 10 | 5 | 0 | 5 |
| 60 | 54 | 48 | 42 | 36 | 30 | 24 | 18 | 12 | 6 | 0 | 6 |
| 70 | 63 | 56 | 49 | 42 | 35 | 28 | 21 | 14 | 7 | 0 | 7 |
| 80 | 72 | 64 | 56 | 48 | 40 | 32 | 24 | 16 | 8 | 0 | 8 |
| 90 | 81 | 72 | 63 | 54 | 45 | 36 | 27 | 18 | 9 | 0 | 9 |
| 100 | 90 | 80 | 70 | 60 | 50 | 40 | 30 | 20 | 10 | 0 | 10 |

FIG. 5A

| DIVISION | | | | | | | | | | |
|---|---|---|---|---|---|---|---|---|---|---|
| ÷ | 1 | 2 | 3 | 4 | 5 | 6 | 7 | 8 | 9 | 10 |
| 0 | 0 | 0 | 0 | 0 | 0 | 0 | 0 | 0 | 0 | 0 |
| 1 | 2 | 3 | 4 | 5 | 6 | 7 | 8 | 9 | 10 | |
| 2 | 4 | 6 | 8 | 10 | 12 | 14 | 16 | 18 | 20 | |
| 3 | 6 | 9 | 12 | 15 | 18 | 21 | 24 | 27 | 30 | |
| 4 | 8 | 12 | 16 | 20 | 24 | 28 | 32 | 36 | 40 | |
| 5 | 10 | 15 | 20 | 25 | 30 | 35 | 40 | 45 | 50 | |
| 6 | 12 | 18 | 24 | 30 | 36 | 42 | 48 | 54 | 60 | |
| 7 | 14 | 21 | 28 | 35 | 42 | 49 | 56 | 63 | 70 | |
| 8 | 16 | 24 | 32 | 40 | 48 | 56 | 64 | 72 | 80 | |
| 9 | 18 | 27 | 36 | 45 | 54 | 63 | 72 | 81 | 90 | |
| 10 | 20 | 30 | 40 | 50 | 60 | 70 | 80 | 90 | 100 | |

FIG. 5B

| | | | DIVISION | | | | | | | |
|---|---|---|---|---|---|---|---|---|---|---|
| 10 | 9 | 8 | 7 | 6 | 5 | 4 | 3 | 2 | 1 | ÷ |
| 0 | 0 | 0 | 0 | 0 | 0 | 0 | 0 | 0 | 0 | 0 |
| 10 | 9 | 8 | 7 | 6 | 5 | 4 | 3 | 2 | 1 | 1 |
| 20 | 18 | 16 | 14 | 12 | 10 | 8 | 6 | 4 | 2 | 2 |
| 30 | 27 | 24 | 21 | 18 | 15 | 12 | 9 | 6 | 3 | 3 |
| 40 | 36 | 32 | 28 | 24 | 20 | 16 | 12 | 8 | 4 | 4 |
| 50 | 45 | 40 | 35 | 30 | 25 | 20 | 15 | 10 | 5 | 5 |
| 60 | 54 | 48 | 42 | 36 | 30 | 24 | 18 | 12 | 6 | 6 |
| 70 | 63 | 56 | 49 | 42 | 35 | 28 | 21 | 14 | 7 | 7 |
| 80 | 72 | 64 | 56 | 48 | 40 | 32 | 24 | 16 | 8 | 8 |
| 90 | 81 | 72 | 63 | 54 | 45 | 36 | 27 | 18 | 9 | 9 |
| 100 | 90 | 80 | 70 | 60 | 50 | 40 | 30 | 20 | 10 | 10 |

INVENTOR
CHARLES FEDYNA

BY Morton, Bernard, Brown, Roberts & Sutherland

ATTORNEYS

ARITHMETIC TEACHING AID

The present invention pertains to a teaching aid. More particularly, the present invention pertains to an arithmetic teaching aid for providing drill in such arithmetic problems as simple addition, subtraction, multiplication and division.

The learning of simple arithmetic is an important part of education since it provides the basis for much of the more advanced work. While some students readily grasp basic arithmetic, others require more drill. There are available devices for providing such drill for students. So called "flash cards" have been used for many years to provide drill in, among other things, arithmetic. Such cards, for example, might have on one side thereof an arithmetic problem such as "7 + 4" and on the other side thereof the answer to that problem "11" or the problem with its answer "7 + 4 = 11." The tutor holds the card up so that the student can see the problem and the tutor can see the answer. The tutor then is able to determine whether the student gives the right answer. Such devices, however, require a large number of cards to provide meaningful drill for the students. A separate card is utilized for each problem, and so to provide meaningful drill, including a large number of varied problems, a large number of cards is required, increasing the likelihood of losing a card. If the tutor determines that one particular problem or type of problem is giving a student greater difficulty than others, the tutor may wish to emphasize that type of problem in the drill. If a large number of flash cards is being utilized for the drill, the tutor must go through them to select those containing the desired type of problem. This slows the drill and loses the interest of the student.

The present invention is a teaching aid providing drill in arithmetic, such as basic addition, subtraction, multiplication and division, and permitting the selection of any of a large number of available problems rapidly and with reduced possibility of losing part of the problem set. In accordance with the present invention, a problem board is provided having on one side a plurality of intersecting rows and columns and with arithmetic indications thereon from which a plurality of arithmetic problems can be obtained and having on the opposite side a similar plurality of rows and columns and with a plurality of arithmetic indications thereon from which answers to the problems are obtained. Indicating means are provided to indicate on the first side the selected problem while simultaneously indicating on the opposite side the answer to that problem. The indicating means can readily be adjusted to indicate any selected problem and its answer. The problem board may be provided with any desired type of arithmetic problems, for example, addition, subtraction, multiplication and division.

These and other aspects and advantages of the present invention are more apparent in the following detailed description and claims, particularly when considered in conjunction with the accompanying drawings. In the drawings:

FIG. 1 is a perspective view of apparatus for providing arithmetic drill in accordance with the present invention;

FIGS. 2A and 2B depict respectively the problem side and answer side of a first embodiment of problem board in accordance with the present invention and adapted for teaching addition;

FIGS. 3A and 3B depict respectively the problem side and the answer side of a second embodiment of problem board in accordance with the present invention and adapted for teaching substraction;

FIGS. 4A and 4B depict respectively the problem side and the answer side of another embodiment of problem board in accordance with the present invention and adapted for teaching multiplication; and FIGS. 5A and 5B depict respectively the problem side and the answer side of an additional embodiment of problem board in accordance with the present invention and adapted for teaching division.

FIG. 1 depicts teaching device 10 including problem board 12 with a first indicating slide 14 extending horizontally across the problem board and a second indicating slide 16 extending vertically across the problem board. The intersecting indicators 14 and 16 define a problem on the front side of problem board 12 and indicate the answer to that problem on the opposite side.

FIG. 2A illustrates the front side of a first embodiment of problem board 12 suitable for use in the teaching of addition, while FIG. 2B illustrates the reverse side of that embodiment of the problem board. As seen in FIG. 2A, the front side of this embodiment of problem board 12 includes a first horizontal row 22, having a plurality of locations 23 therein, and a first vertical column 24 having a plurality of locations 25 therein. The locations 23 bear the numerical indicia "0" through "10," and the locations 25 likewise bear the numerical indicia "0" through "10" in the illustrative example of FIG. 2A. Beneath each location 23 of first horizontal row 22 is a vertical column 20. Extending from each location 25 of first column 24 is a horizontal row 18. The intersections of the several rows 18 and the several columns 20 define a plurality of problem spaces or locations 26 which are blank in this embodiment of the present invention adapted for teaching addition.

The first indicating member 14 comprises a horizontal bar extending the width of problem board 12 and adapted to slide vertically over the height of the problem board. The horizontal bar includes an outer frame 28 having an opening 30 of a height substantially equal to the height of one horizontal row 18 on problem board 12 and of a width extending across the entire width of the problem board. The second indicating member 16 is of similar design but extends vertically over the height of problem board 12 and is adapted to slide horizontally across the width thereof. Opening 32 in indicating member 16 is of a width substantially equal to the width of one column 20 and of a height substantially the same as the height of problem board 12.

As seen in FIG. 2B, the reverse side of this embodiment of problem board 12 includes a like plurality of rows 40 and columns 36. Within first row 34, each location bears a numerical indicia from 10 through 0, and within first column 38, each location bears a numerical indicia from 0 through 10. In this respect, the locations of first row 34 and first column 38 are identical with the corresponding locations opposite them in first row 18 and first column 24 on the front side of problem board 12, depicted in FIG. 2A. Each of the locations 44 defined by the intersections of the rows 40 and the columns 36 has within it the number which is the sum of the first column indicia of that row and of the first row indicia of that column. Thus, when, as depicted in FIG.

2A, indicating member 14 encloses the numeral 4 of column 24 and indicating member 16 encloses the numeral 7 from row 22, the student to whom this is shown is to indicate the sum of 4 and 7. On the reverse side, as depicted in FIG. 2B, indicating member 14 likewise encloses the numeral 4 in first column 38 and indicating member 16 encloses the numeral 7 in first row 34. On the reverse side of FIG. 2B, intersection 44 of indicating members 14 and 16 then encloses the numeral 11 which is the sum of that row's first column numerical indicia 4 and that column's first row numerical indicia 7. Consequently, the tutor who is viewing the second side of FIG. 2B has the correct problem "4 + 7" and the correct answer "11" available to him. The tutor can move indicating members 14 and 16 as desired to present any addition problem to the student.

FIGS. 3A and 3B illustrate respectively the front side and the reverse side of an embodiment of the present invention adapted for the teaching of subtraction. The first horizontal row 46 in FIG. 3A provides a numerical indicia 0 through 10 for each vertical column 48. The locations of first column 54 are blank. Within each vertical column 48, the locations 50 defined by the intersections of that column 48 and the horizontal rows 52 are numbered in sequence, commencing with the top row 52 the spaces 50 of which are numbered 0 through 10. Preferably, the reverse side of this embodiment, depicted in FIG. 3B, is identical with the reverse side of FIG. 2B. Thus, those locations of the first side of FIG. 3A which bear numerical indicia have the identical indicia within the corresponding and opposite second side location of FIG. 3B. The student is presented with the front side of FIG. 3A, having the indicating members 14 and 16 positioned as desired by the tutor. The selected problem space 56 is defined by the intersection of indicating members 14 and 16. The student must determine the result of subtracting from the numerical indicium within the selected problem space the numerical indicium within the first row 46 location 50 which defines that column 48 and which is within indicating member 16. Thus, as illustrated in FIG. 3A, the student must determine the result of subtracting 4 from 12. On the reverse side, the instructor sees the problem and the desired answer 8 within the answer space 57 of column 58 which is within indicating member 14. Alternatively, the problem defining locations can be vacant on the reverse side of FIG. 3B, with numerical indicia only within answer column 58. Again, the instructor can move indicating members 14 and 16 to select any desired subtraction problem.

FIGS. 4A and 4B depict an embodiment of the present invention suitable for teaching multiplication. The front side of FIG. 4A is identical to the addition front side of FIG. 2A. Indicating members 14 and 16 are positioned to indicate the numbers selected from first row 60 and first column 62 which are to be multiplied. The reverse side, as depicted in FIG. 4B, includes first row 64 and first column 66, the locations of which bear numerical indicia identical with the indicia in the corresponding and opposite locations in row 60 and column 62 of the first side of FIG. 4A and contains in the locations defined by the intersections of the rows and columns, the products of the numbers of the location defining column's first row location and the location defining row's first column location. Thus, when as depicted in FIG. 4A, indicating member 14 indicates the numeral 2 and indicating member 16 indicates the numeral 8, on the reverse side of FIG. 4B the selected answer space 65 in the intersection of indicating members 14 and 16 shows the product 16 of that multiplication.

FIGS. 5A and 5B illustrate an embodiment suitable for the teaching of division. Each problem space 67 of the columns 68 on the front side as depicted in FIG. 5A contains a numerical indicium which is to be divided by the numerical indicium within that location-defining column's first row 70 location. Since division by zero does not result in a finite number, first row 70 does not include a 0. Preferably, the reverse side, as depicted in FIG. 5B, is identical with the reverse side of FIG. 4B, with the exception of the column defined by the first row location bearing the numerical indicium 0. Thus, just as in each of the other preferred embodiments, those locations of the first side of FIG. 5A which bear numerical indicia have the identical indicia within the corresponding and opposite second side location of FIG. 5B. The locations of first column 72 bear numerical indicia which are the quotients resulting from division of the numerical indicia within the locations defined by those first column locations and the locations of first row 74. Thus, when as depicted in FIG. 5A, indicating members 14 and 16 are positioned to show at their intersection numerical indicium 56 with indicating member 16 positioned at the row 70 numerical indicium 8, on the reverse side of FIG. 5B indicating member 14 shows at column 72 the quotient 7 obtained by dividing 56 by 8. Again, as an alternative, the reverse side of FIG. 5B can have numerical indicia only in answer column 72.

It is thus seen that the problem board of the present invention provides apparatus suitable for presenting drill in basic arithmetic which is simple and easy to use and which does not require numerous components that otherwise might easily be lost. Although the present invention is described with reference to preferred embodiments, numerous modifications and rearrangements could be made, and still the result would come within the scope of the invention. By way of example, although the problem boards have been illustrated with rows and columns designated 0 through 10, other numerical indicia could be utilized, and the numerical indicia need not be in sequence, and so a wide variety of arithmetic drill can be provided. Additionally, while FIGS. 3A and 5A depict a first column without numerical indicia, the same arithmetic drill can be achieved with apparatus having instead a first row without numerical indicia.

What is claimed is:
1. An arithmetic teaching device comprising:
a problem board having a first side and a second side opposite the first side, the first side having thereon a first plurality of rows and a second plurality of columns, the intersections of the first side rows and columns defining a plurality of first side locations, the second side having thereon a first plurality of rows and a second plurality of columns, the intersections of the second side rows and columns defining a plurality of second side locations, a unique one of the second side locations being opposite and corresponding to each first side location, the problem board second side having problem-defining sequential numerical indicia in every location of a first row of locations and in every location of a first column of locations and having in each remaining second side location the sum of the numerical indi- cium within the location-defining column's first row location and the numerical indicium within the location-defining row's first column location, the problem board first side having identical indicia in each corresponding and opposite location except in every location of only one of a first row of locations or a first column of locations; and indicating means for indicating a selected one of the first side locations and presenting on the first side an arithmetic problem while simultaneously indicating the opposite and corresponding second side location and presenting on the second side the answer to the presented first side arithmetic problem, whereby the arithmetic teaching device is adapted for teaching subtraction.

2. An arithmetic teaching device comprising:

a problem board having a first side and a second side opposite the first side, the first side having thereon a first plurality of rows and a second plurality of columns, the intersections of the first side rows and columns defining a plurality of first side locations, the second side having thereon a first plurality of rows and a second plurality of columns, the intersections of the second side rows and columns defining a plurality of second side locations, a unique one of the second side locations being opposite and corresponding to each first side location, the problem board second side having problem defining sequential numerical indicia in every location of a first row of locations and in every location of a first column of locations and having in each remaining location the product of the numerical indicium within the location-defining column's first row location and the numerical indicium within the location-defining row's first column location, the problem board first side having identical indicia in each corresponding and opposite location except in every location of only one of a first row of locations or a first column of locations; and indicating means for indicating a selected one of the first side locations and presenting on the first side an arithmetic problem while simultaneously indicating the opposite and corresponding second side location and presenting on the second side the answer to the presented first side arithmetic problem, whereby the arithmetic teaching device is adapted for teaching division.

* * * * *

UNITED STATES PATENT OFFICE
CERTIFICATE OF CORRECTION

Patent No. 3,735,504         Dated May 29, 1973

Inventor(s) CHARLES FEDYNA

It is certified that error appears in the above-identified patent and that said Letters Patent are hereby corrected as shown below:

In the heading, correct the identification of the inventor to read:

[76] Inventor: Charles Fedyna, 32 Kleber Avenue,
Youngstown, Ohio 44515

Signed and sealed this 20th day of November 1973.

(SEAL)
Attest:

EDWARD M. FLETCHER, JR.         RENE D. TEGTMEYER
Attesting Officer               Acting Commissioner of Patents